(12) United States Patent
Cheng et al.

(10) Patent No.: US 7,675,027 B2
(45) Date of Patent: Mar. 9, 2010

(54) MOTION-DETECTING MODULE

(75) Inventors: Chia-Chu Cheng, Yonghe (TW); Ya-Lun Lee, Yongkang (TW); Yu-Wei Lu, Fongshan (TW)

(73) Assignee: Lite-On Semiconductor Corp., Taipei Hsien (TW)

( * ) Notice: Subject to any disclaimer, the term of this patent is extended or adjusted under 35 U.S.C. 154(b) by 160 days.

(21) Appl. No.: 11/984,557

(22) Filed: Nov. 20, 2007

(65) Prior Publication Data

US 2008/0116357 A1 May 22, 2008

(30) Foreign Application Priority Data

Nov. 22, 2006 (TW) .............................. 95220558 U

(51) Int. Cl.
*G06M 7/00* (2006.01)
*G09G 5/08* (2006.01)
*H01J 40/14* (2006.01)
*H01L 31/00* (2006.01)

(52) U.S. Cl. ............... 250/239; 250/221; 250/222.1; 345/166; 257/433; 257/680

(58) Field of Classification Search ........... 250/221, 250/222.1, 239; 345/166; 257/680, 432–434
See application file for complete search history.

(56) References Cited

U.S. PATENT DOCUMENTS

| 4,650,285 | A * | 3/1987 | Stevenson | 250/227.11 |
|---|---|---|---|---|
| 4,751,505 | A * | 6/1988 | Williams et al. | 345/166 |
| 6,462,330 | B1 * | 10/2002 | Venkat et al. | 250/239 |
| 6,541,762 | B2 * | 4/2003 | Kang et al. | 250/239 |
| 6,653,724 | B1 * | 11/2003 | Kim et al. | 257/684 |
| 7,199,350 | B2 * | 4/2007 | Chien | 250/208.2 |
| 7,233,025 | B2 * | 6/2007 | Davuluri et al. | 257/81 |
| 7,244,925 | B2 * | 7/2007 | Xie | 250/221 |
| 7,446,384 | B2 * | 11/2008 | Paik et al. | 257/431 |
| 2003/0034441 | A1 * | 2/2003 | Kang et al. | 250/221 |
| 2004/0000698 | A1 * | 1/2004 | Chen | 257/433 |
| 2005/0253058 | A1 * | 11/2005 | Leong et al. | 250/239 |
| 2006/0007148 | A1 * | 1/2006 | Theytaz et al. | 345/163 |
| 2006/0016967 | A1 * | 1/2006 | Findlay et al. | 250/221 |
| 2006/0091487 | A1 * | 5/2006 | Hanada et al. | 257/432 |
| 2006/0266934 | A1 * | 11/2006 | Lye Hock et al. | 250/221 |
| 2006/0284845 | A1 * | 12/2006 | Wu et al. | 345/166 |
| 2007/0057166 | A1 * | 3/2007 | Kuo et al. | 250/221 |
| 2007/0063130 | A1 * | 3/2007 | Ahn et al. | 250/221 |
| 2007/0138377 | A1 * | 6/2007 | Zarem | 250/221 |
| 2007/0188457 | A1 * | 8/2007 | Wu et al. | 345/166 |
| 2008/0116357 | A1 * | 5/2008 | Cheng et al. | 250/216 |

(Continued)

*Primary Examiner*—John R Lee
(74) *Attorney, Agent, or Firm*—Rosenberg, Klein & Lee

(57) ABSTRACT

A motion-detecting module includes a PCB, a light-emitting unit, and a light-sensing unit. The light-emitting unit is electrically disposed over the PCB. The light-sensing unit has a light-sensing die electrically disposed on the PCB and a package cover covered on the light-sensing die, and the package cover has a through hole corresponding to the light-sensing die and a transparent element disposed in the through hole. The present invention does not need extra package protection body of the prior art for protecting the light-sensing die during the transport of the light-sensing module. The present invention use original package cover to prevent the light-sensing die from being damaged by external force, and the original package cover shelters the light-sensing die from extra stray light.

7 Claims, 4 Drawing Sheets

U.S. PATENT DOCUMENTS

| | | | |
|---|---|---|---|
| 2008/0149814 A1* | 6/2008 | Ooi et al. | 250/221 |
| 2008/0156967 A1* | 7/2008 | Oh et al. | 250/221 |
| 2008/0185508 A1* | 8/2008 | Cheng et al. | 250/239 |
| 2008/0193117 A1* | 8/2008 | Cheng et al. | 396/153 |
| 2008/0211049 A1* | 9/2008 | Grewal | 257/433 |
| 2009/0057799 A1* | 3/2009 | Chan et al. | 257/433 |

* cited by examiner

MOTION-DETECTING MODULE

BACKGROUND OF THE INVENTION

1. Field of the Invention

The present invention relates to a motion-detecting module, and particularly relates to a motion-detecting module that has a light-sensing die directly and electrically disposed on a PCB without performing a sensor die packaging process.

2. Description of the Related Art

In the field of optical mouse technology of the prior art, a light source device such as LED projects an incident light onto a surface such as a desk or a mouse pad to form a reflected light, and the reflected light is captured via a light-sensing module. The motion of an optical mouse can then be acquired by detecting changes in reflection due to the surface roughness or uneven structures on the surface.

The light-sensing module of the prior art for detecting motion has a light-sensing die packaged via a package protection body firstly, and then the light-sensing die is electrically connected to a PCB. This process prevents the light-sensing die from being damaged during the transport of the light-sensing module. However, the above-mentioned method would increase extra cost (such as extra package material and device) and process (package process).

SUMMARY OF THE INVENTION

One particular aspect of the present invention is to provide a motion-detecting module. The motion-detecting module has a light-sensing die directly and electrically disposed on a PCB without performing a sensor die packaging process, and then a package cover with a transparent area is covered over the light-sensing die. In other words, the present invention does not need extra package protection body of the prior art for protecting the light-sensing die during the transport of the motion-detecting module. The present invention use original package cover to prevent the light-sensing die from being damaged by external force, and the original package cover shelters the light-sensing die from extra stray light.

In order to achieve the above-mentioned aspects, the present invention provides a motion-detecting module, including a PCB, a light-emitting unit, and a light-sensing unit. The light-emitting unit is electrically disposed over the PCB. The light-sensing unit has a light-sensing die electrically disposed on the PCB and a package cover covered on the light-sensing die, and the package cover has a through hole corresponding to the light-sensing die and a transparent element disposed in the through hole.

In order to achieve the above-mentioned aspects, the present invention provides a motion-detecting module, including a PCB, a light-emitting unit, and a light-sensing unit. The light-emitting unit has a light-emitting die electrically disposed over the PCB. The light-sensing unit has a light-sensing die electrically disposed on the PCB and a package cover covered on the light-sensing die, and the package cover has a through hole corresponding to the light-sensing die and a transparent element disposed in the through hole.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1:
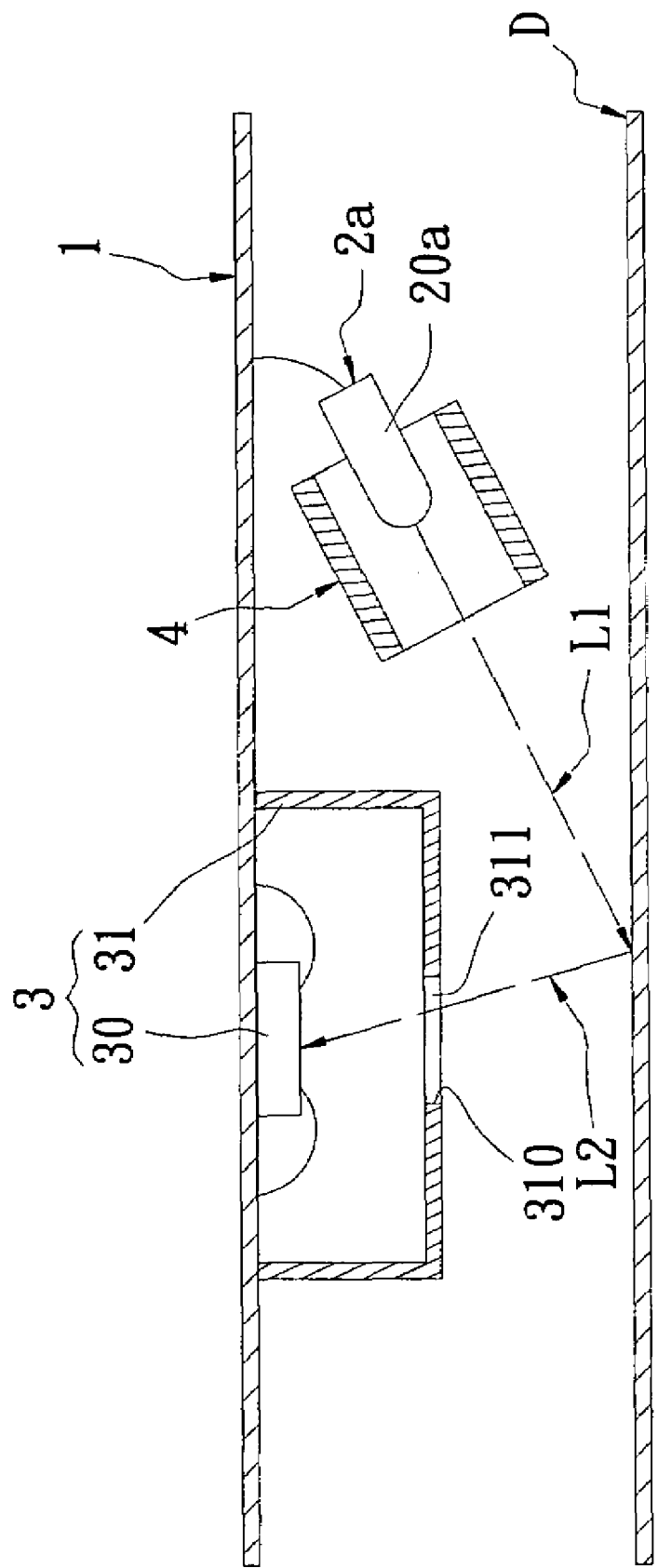
FIG. 1 is a cross-sectional, schematic view of a motion-detecting module according to the first embodiment of the present invention.

FIG. 1 shows a cross-sectional, schematic view of a motion-detecting module according to the first embodiment of the present invention. The motion-detecting module includes a PCB 1, a light-emitting unit 2a, and a light-sensing unit 3.

The light-emitting unit 2a can be a light-emitting element 20a such as an LED. The light-emitting element 20a has a coherent illuminant or an incoherent illuminant. Moreover, the light-emitting unit 2a is disposed on a fixed structure 4 and over the PCB 1. The light-emitting unit 2a is electrically connected with the PCB 1 via a leading wire.

Furthermore, the light-sensing unit 3 has a light-sensing die 30 and a package cover 31. The light-sensing die 30 is electrically disposed on the PCB 1 via wire-bonding way. The package cover 31 is covered on the light-sensing die 30, and the package cover 31 is opaque.

In addition, the package cover 31 has a through hole 310 corresponding to the light-sensing die 30 and a transparent element 311 disposed in the through hole 310. The transparent element 311 can be a transparent glass or a transparent colloid, and the transparent colloid can be an epoxy, acrylic, or any transparent material.

Therefore, the light-emitting element 20a projects a light beam L1 onto a document D to form a reflective light L2, and then the reflective light L2 projects to the light-sensing die 30 through the transparent element 311 to sense images of the document D.

Figure 2:
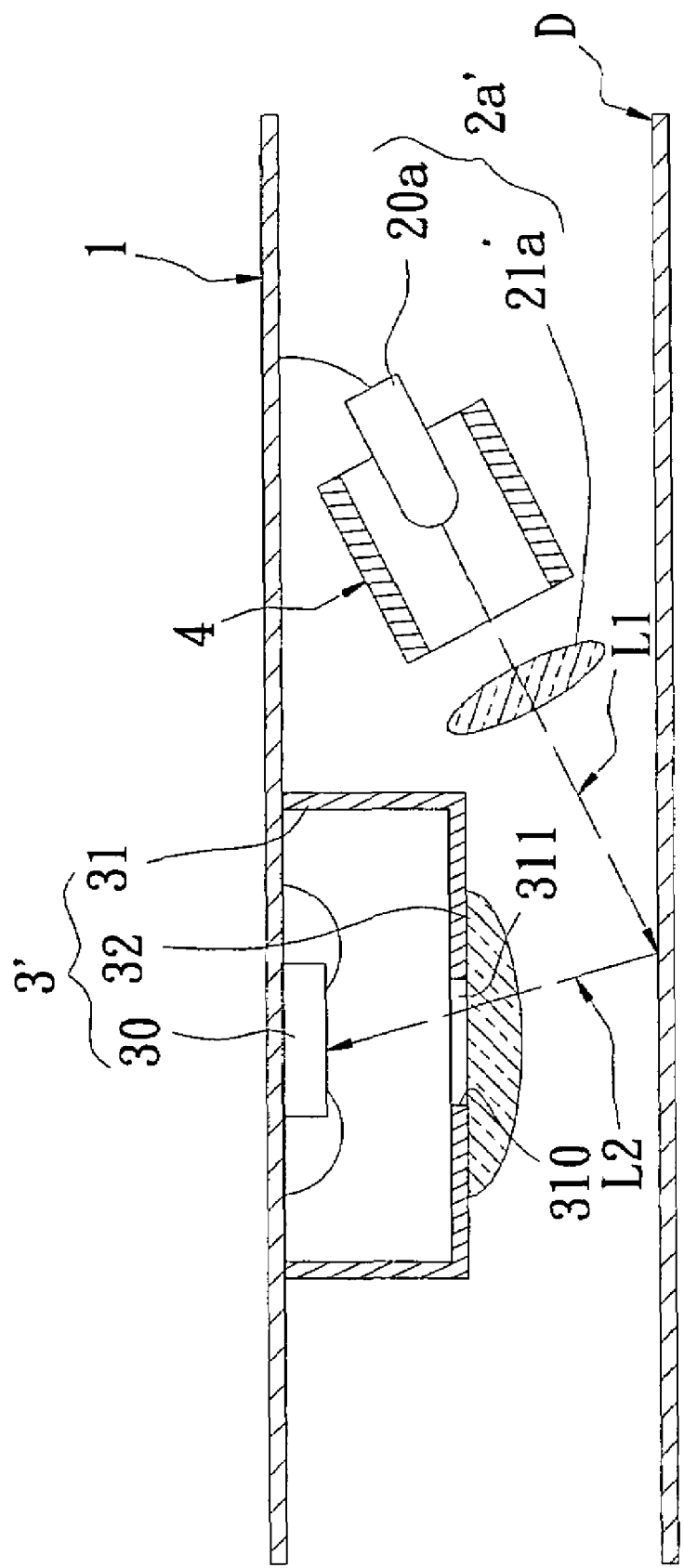
FIG. 2 is a cross-sectional, schematic view of a motion-detecting module according to the second embodiment of the present invention.

FIG. 2 shows a cross-sectional, schematic view of a motion-detecting module according to the second embodiment of the present invention. The difference between the second embodiment and the first embodiment is that in the second embodiment a light-emitting unit 2a' is composed of a light-emitting element 20a and a lighting lens 21a. The lighting lens 21a has a lens surface as a spherical surface or a non-spherical surface.

Moreover, the light-sensing unit 3' further includes an imaging lens 32 disposed outside the through hole 310 and covered over the through hole 310. The imaging lens 32 corresponds to the light-sensing die 30, and the imaging lens 32 is integrated with the package cover 31. The imaging lens 32 can be an epoxy or acrylic material. The imaging lens 32 has a lens surface as a spherical surface or a non-spherical surface.

Figure 3:
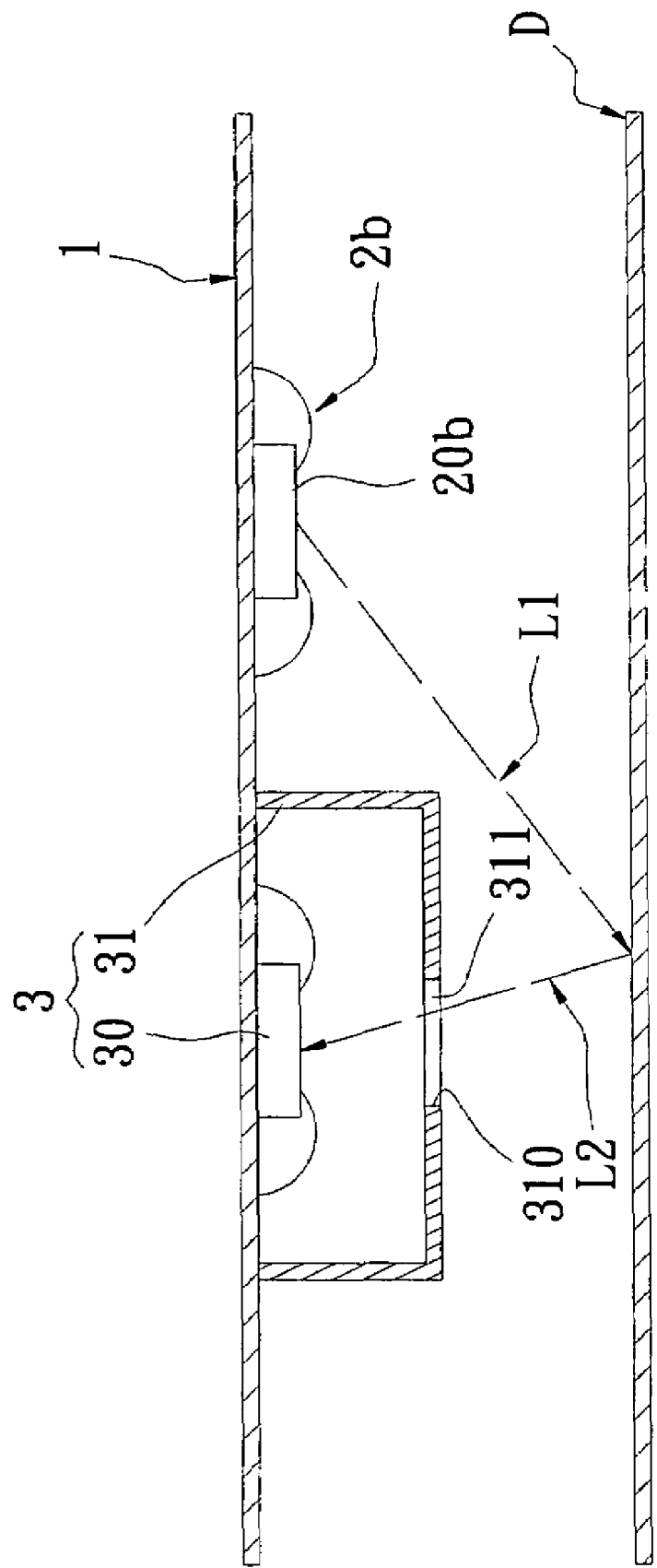
FIG. 3 is a cross-sectional, schematic view of a motion-detecting module according to the third embodiment of the present invention.

FIG. 3 shows a cross-sectional, schematic view of a motion-detecting module according to the third embodiment of the present invention. The difference between the third embodiment and the second embodiment is that in the third embodiment a light-emitting unit 2b has a light-emitting die 20b electrically disposed on the PCB 1. Therefore, the light-emitting die 20b projects a light beam L1 onto a document D to form a reflective light L2, and then the reflective light L2 projects to the light-sensing die 30 through the transparent element 311 to sense images of the document D.

Figure 4:
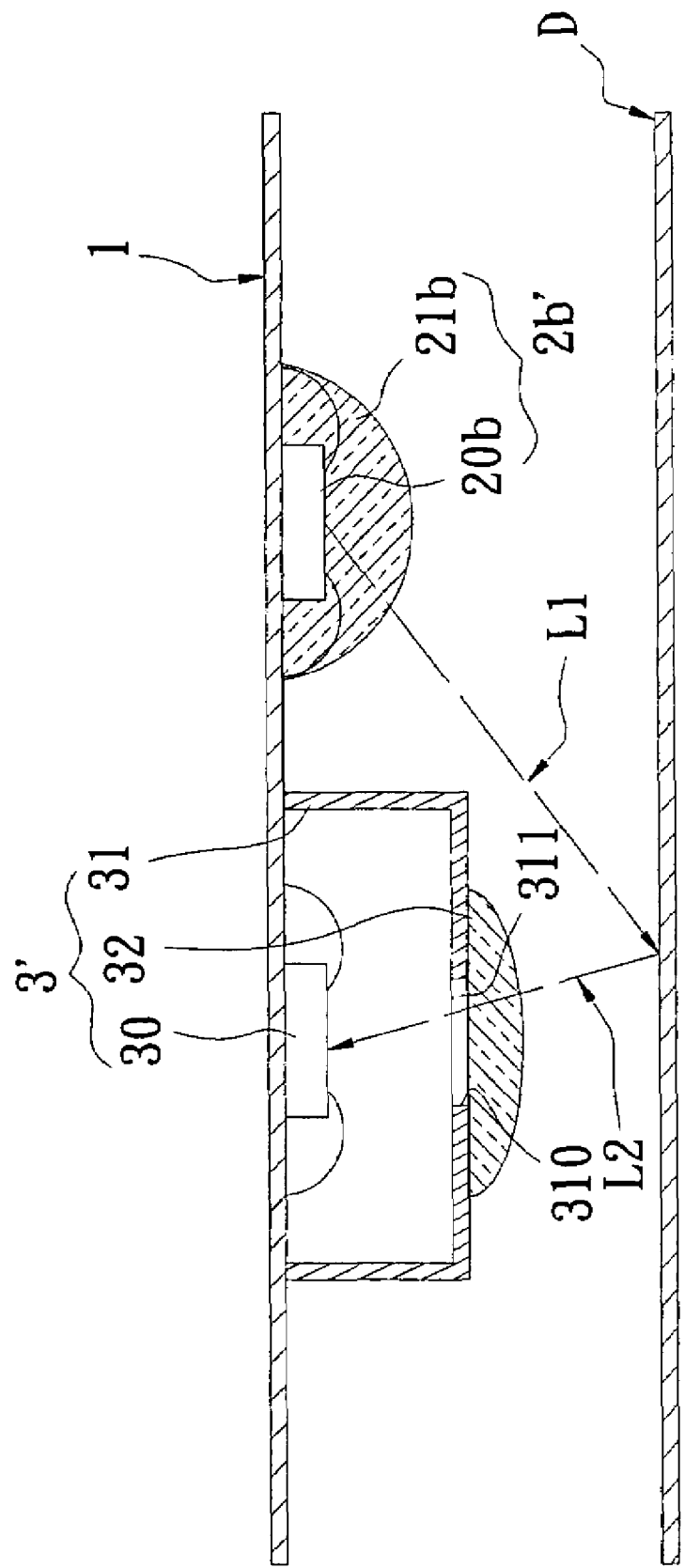
FIG. 4 is a cross-sectional, schematic view of a motion-detecting module according to the fourth embodiment of the present invention.

FIG. 4 shows a cross-sectional, schematic view of a motion-detecting module according to the fourth embodiment of the present invention. The difference between the fourth embodiment and the third embodiment is that in the fourth embodiment a light-emitting unit 2b' is composed of a light-emitting element 20b and a lighting lens 21b. The lighting lens 21b has a lens surface as a spherical surface or a non-spherical surface.

Moreover, the light-sensing unit 3' further includes an imaging lens 32 disposed outside the through hole 310 and covered over the through hole 310. The imaging lens 32 is integrated with the package cover 31. The imaging lens 32 can be an epoxy or acrylic material. The imaging lens 32 has a lens surface as a spherical surface or a non-spherical surface.

In conclusion, the light-sensing die 30 of the motion-detecting module is directly and electrically disposed on a PCB without performing a sensor die packaging process, and then the package cover 31 with a transparent area (the transparent element 311) is covered over the light-sensing die 30. In other words, the present invention does not need extra package protection body of the prior art for protecting the light-sensing die 30 during the transport of the motion-detecting module. The present invention use original package cover 31 to prevent the light-sensing die 30 from being damaged by external force, and the original package cover 31 shelters the light-sensing die 30 from extra stray light.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A motion-detecting module, comprising:
    a PCB;
    a light-emitting unit electrically disposed over the PCB, the light-emitting unit includes a light-emitting die mounted to the PCB and electrically coupled thereto by a pair of leads, the light-emitting die and pair of leads being encapsulated by a material having a contour to form a lens; and
    a light-sensing unit having a light-sensing die electrically disposed on the PCB and a package cover covered on the light-sensing die, wherein the package cover has a through hole corresponding to the light-sensing die, a transparent element disposed in the through hole and an imaging lens overlaying the hole.

2. The motion-detecting module as claimed in claim 1, wherein the light-emitting die provides a coherent illumination.

3. The motion-detecting module as claimed in claim 1, wherein the package cover is opaque.

4. The motion-detecting module as claimed in claim 1, wherein the transparent element is selected from the group consisting of a transparent glass and a transparent colloid.

5. The motion-detecting module as claimed in claim 4, wherein the transparent colloid is formed of a material selected from the group consisting of an epoxy composition and an acrylic material.

6. The motion-detecting module as claimed in claim 1, wherein the imaging lens is formed of a material selected from the group consisting of an epoxy composition and an acrylic material.

7. The motion-detecting module as claimed in claim 1, wherein the light-emitting die provides an incoherent illumination.

* * * * *